Nov. 19, 1963
G. W. DODGE
3,111,097
TRASH BURNER
Filed Aug. 2, 1961
2 Sheets-Sheet 1
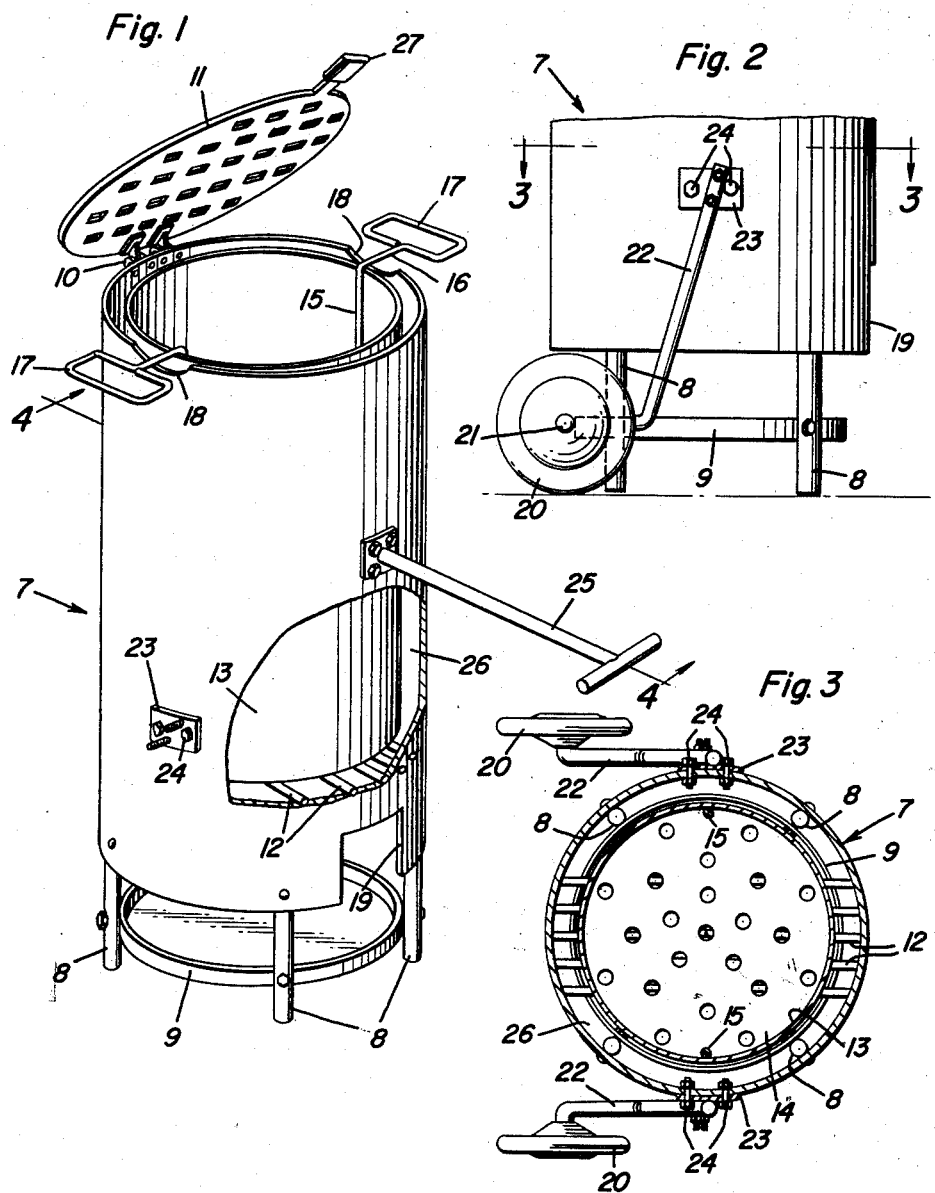
George W. Dodge
INVENTOR.

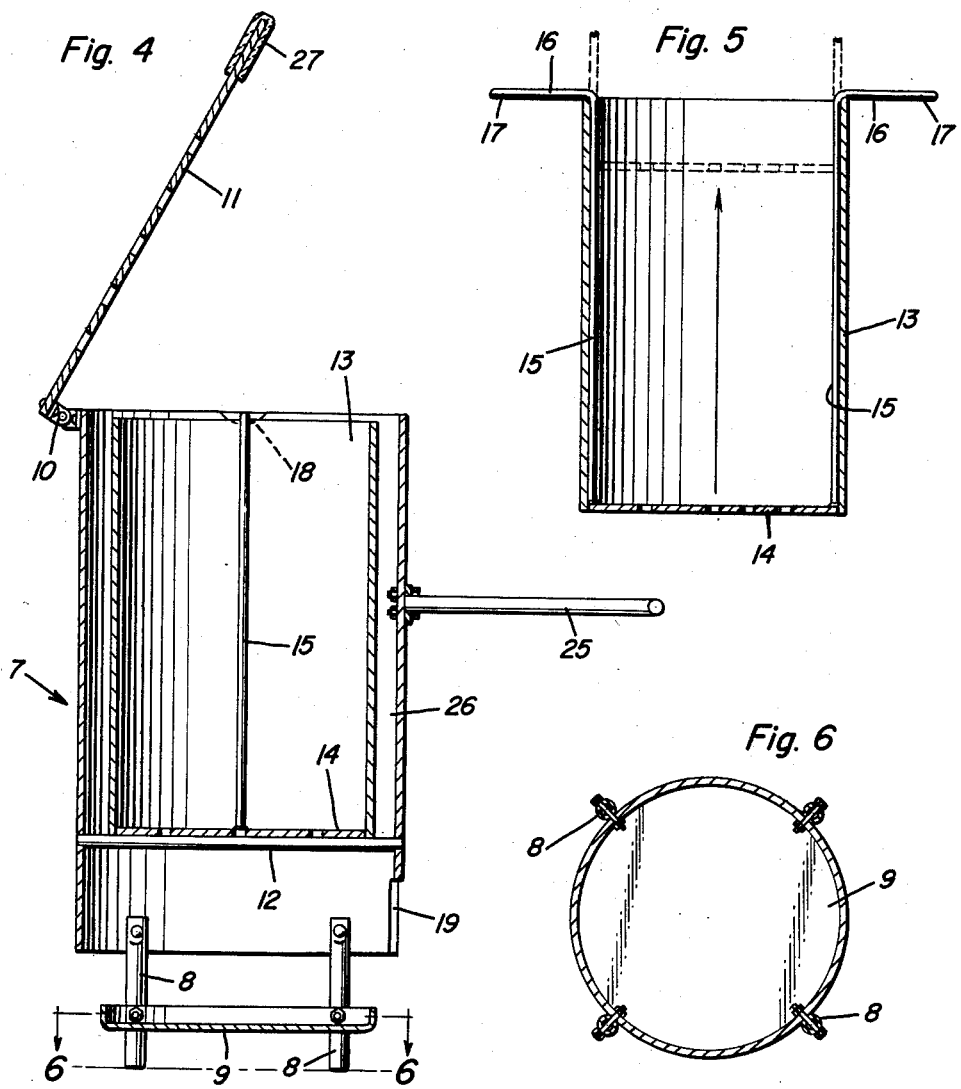

United States Patent Office 3,111,097
Patented Nov. 19, 1963

3,111,097
TRASH BURNER
George W. Dodge, 215 N. Detroit, La Grange, Ind.
Filed Aug. 2, 1961, Ser. No. 128,798
4 Claims. (Cl. 110—18)

This invention relates to new and useful improvements in trash burners and has for its primary object to provide, in a manner as hereinafter set forth, a device of this character comprising novel draft means whereby rapid, complete combustion is ensured.

Another important object of the present invention is to provide an improved trash burner of the aforementioned character comprising a removable inner container and grate of a unique construction which may be readily emptied and cleaned.

Still another important object of the invention is to provide a trash burner of the character described which, if desired, may be moved from place to place with a minimum of effort.

Other objects of the invention are to provide a trash burner of the character set forth which will be comparatively simple in construction, strong, durable, compact, of light weight, safe and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a trash burner constructed in accordance with the present invention, a portion of the casing being broken away;

FIGURE 2 is a view in side elevation of the lower portion of the device;

FIGURE 3 is a view in horizontal section, taken substantially on the line 3—3 of FIGURE 2;

FIGURE 4 is a vertical sectional view, taken substantially on the line 4—4 of FIGURE 1;

FIGURE 5 is a vertical sectional view through the inner container or receptacle; and FIGURE 6 is a view in horizontal section, taken substantially on the line 6—6 of FIGURE 4.

Referring now to the drawing in detail, it will be seen that the embodiment of the invention which has been illustrated comprises a vertical cylindrical casing of suitable metal which is designated generally by reference numeral 7. The casing 7, which may be of any desired dimensions, is of a uniform diameter throughout and open at both ends. Secured in the lower portion of the casing 17 and depending therefrom is a plurality of metallic supporting legs 8. Secured on intermediate portions of the legs 8 is of removable ash pan or receptacle 9. Hingedly mounted at 10 for vertical swinging movement on the upper end portion of the casing 7 is a cover which is perforated to provide a spark arrester 11.

Mounted horizontally in the lower portion of the casing 7, in spaced relation to the lower end thereof, is a plurality of spaced, parallel bars or rods 12. Removably mounted in the casing 7 in inwardly spaced relation thereto and resting on the rods 12 is a cylindrical container 13 for the reception of the trash to be burned. The container 13 includes a removable bottom which is apertured to provide a circular grate 14. Affixed to the perforated container bottom 14 and extending upwardly therefrom are diametrically opposite lift rods 15 comprising outwardly right angularly bent upper end portions 16 which terminate in handles 17. The portions 16 of the lift rods 15 extend outwardly across the upper ends of the container 13 and the casing 7. As shown to advantage in FIGURE 4 of the drawing, the top of the container 13 is below the horizontal plane of the top of the casing 7, the latter being notched or recessed, as at 18, to receive the portions 16 of the lift rods 15 whereby the hinged cover or spark arrester 11 may seat on the upper end of the casing 7. Below the supporting bars or rods 12 the front of the casing 7 is provided with an additional draft opening 19.

Optional wheels 20 are provided to facilitate moving the device from place to place, if desired. The wheels 20 are journaled on spindles 21 which are turned outwardly on the lower ends of angulated arms 22. Affixed to the other ends of the angulated arms 22 are mounting plates 23 which are apertured to accommodate bolts 24 for removably securing the wheel units on opposite sides of the casing 7. Affixed to the front of the casing at an intermediate point and projecting horizontally therefrom is a generally T-shaped handle 25 through the medium of which the burner may be tilted to transfer the load from the legs 8 to the wheels 20 when it is desired to move said burner.

It is thought that the use of the device will be readily apparent from a consideration of the foregoing. Briefly, the cover or spark arrester 11 is swung upwardly to open position and the trash to be burned is deposited in the container or receptacle 13. The spaced container 13 and casing 7 define an annular passage 26 for the free upward flow of air around said container. Of course, air also passes upwardly through the perforated bottom or grate 14 and the container 13. The air enters freely through the open bottom of the casing 7 and the opening or recess 19 therein. With the spark arrester 11 in closed position on top of the casing 7, safe operation is ensured, rendering the presence of an attendant unnecessary. If desired, suitable handles may be provided on the container 13 to facilitate inserting and removing same when necessary. When the container 13 is removed, the perforated bottom or grate 14 is removed therewith, being hung thereon by the lift rods 15 with the outwardly extending upper end portions 16. Or, the perforated bottom or grate 14 may be lifted independently through the medium of the handles 17 should it be desired, for example, to agitate the burning trash to promote combustion. Of course, the removable pan 9 catches ashes, sparks, etc., falling from the container 13 through the bottom or grate 14 thereof and the rods or bars 12. A suitable heat insulated operating handle 27 is provided on the front of the cover or spark arrester 11 and parallels the handle 25. Should it be desired to move the device the casing 7 is swung upwardly and rearwardly through the medium of the handle 25 for transferring the weight of said device to the wheels 20 in an obvious manner. Also if desired, the wheels may be readily removed and stored, as when the burner is to remain in one location over a considerable period of time. As shown, the upper end portions of the arms 22 are apertured to receive nutted studs which project from the plates 23 whereby said plates may be left on the casing 7 if desired. It will be observed that the container 13 comprises a cylindrical body in which the perforated bottom 14 is operable somewhat in the manner of a follower. The ash pan 9 braces and rigidifies the supporting legs 8.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A trash burner comprising, in combination, a vertical cylindrical casing open at both ends, a cylindrical trash receptacle removably mounted in said casing in spaced, concentric relation thereto, a plurality of vertical supporting legs secured in the lower end portion of the casing at circumferentially spaced points and depending therefrom, a circular ash pan peripherally abutting the legs at an intermediate point and affixed thereto for mounting said pan thereon and for bracing said legs, plates mounted on diametrically opposite sides of the casing at an intermediate point, spaced studs projecting from said plates, downwardly and forwardly extending angulated arms on the plates having apertures in one end portion receiving the studs, nuts threaded on the studs for removably securing the arms on the plates, said arms including right angularly bent, outwardly extending free end portions providing spindles, wheels journaled on the spindles for supporting the casing in lieu of the legs, and a rearwardly projecting handle affixed to the casing for tilting same forwardly for transferring the weight thereof to the wheels.

2. The combination of claim 1, together with a plurality of spaced, parallel rods mounted horizontally in the casing in vertically spaced relation to the lower end thereof and supporting the trash receptacle therein.

3. The combination of claim 2, said trash receptacle including a cylindrical body, a circular perforated bottom slidable in said body and resting therewith on the rods, and a pair of lifting rods fixedly secured to diametrically opposite portions of the bottom and extending upwardly therefrom through the body.

4. The combination of claim 3, said lifting rods comprising horizontal upper end portions traversing the upper ends of the cylinder and the body and terminating in handles.

References Cited in the file of this patent

UNITED STATES PATENTS

| | | |
|---|---|---|
| D. 182,743 | Rodman | May 6, 1958 |
| 435,184 | Manser | Aug. 26, 1890 |
| 1,021,679 | Jansen | Mar. 26, 1912 |
| 1,136,294 | Switzer | Apr. 20, 1915 |
| 1,298,762 | Milligan | Apr. 1, 1919 |
| 2,035,167 | Korach | Mar. 24, 1936 |
| 2,221,098 | Langsam | Nov. 12, 1940 |
| 2,608,943 | Weggel | Sept. 2, 1952 |
| 2,900,897 | Fisher | Aug. 25, 1959 |
| 2,952,226 | Sherman | Sept. 13, 1960 |